B. H. LARKIN.
METHOD OF CUTTING CAN CAPS AND CAN ENDS FROM SHEET METAL.
APPLICATION FILED APR. 14, 1909.

944,793.

Patented Dec. 28, 1909.

2 SHEETS—SHEET 1.

Witnesses
C. H. Walker
Grace P. Brereton

Inventor
Bernard H. Larkin
By
Sturtevant & Mason
Attorneys

B. H. LARKIN.
METHOD OF CUTTING CAN CAPS AND CAN ENDS FROM SHEET METAL.
APPLICATION FILED APR. 14, 1909.

944,793.

Patented Dec. 28, 1909.

2 SHEETS—SHEET 2.

Witnesses
C. H. Walker.
Grace P. Brereton.

Inventor
Bernard H. Larkin
By
Sturtevant & Mason
Attorneys

UNITED STATES PATENT OFFICE.

BERNARD H. LARKIN, OF CHICAGO, ILLINOIS, ASSIGNOR TO CONTINENTAL CAN COMPANY, OF BALTIMORE, MARYLAND, A CORPORATION OF NEW JERSEY.

METHOD OF CUTTING CAN-CAPS AND CAN ENDS FROM SHEET METAL.

944,793.  Specification of Letters Patent.  Patented Dec. 28, 1909.

Application filed April 14, 1909. Serial No. 489,824.

*To all whom it may concern:*

Be it known that I, BERNARD H. LARKIN, a citizen of the United States, residing at Chicago, in the county of Cook, State of Illinois, have invented certain new and useful Improvements in Methods of Cutting Can-Caps and Can Ends from Sheet Metal, of which the following is a description, reference being had to the accompanying drawing and to the figures of reference marked thereon.

The invention relates to new and useful improvements in the method of cutting can caps, in conjunction with can ends, having a central opening, from sheet metal.

An object of the invention is to expedite the cutting of the can caps from the waste material cut out in forming the central opening in the can head.

The invention consists in cutting the can cap from the waste material which is formed in cutting out the central opening in the can head, prior to cutting out the can head, said material forming the can cap being of smaller diameter than the opening in the can head so that a portion of the waste material is left intact with the material to form a can head, which remaining waste material is cut out so as to properly form the central opening in the can head, when the can head is formed.

The invention further consists in cutting from a sheet of material in one operation, a can cap from the waste material in the center of each can head, which is to be subsequently cut from the sheet of material.

The invention further consists in cutting and forming a can cap from the waste material in the center of each of the can heads, subsequently cut from the sheet of metal, which can caps are cut and formed simultaneously with the cutting and forming of a can cap from the waste ends of the sheet of metal.

Figure 1:
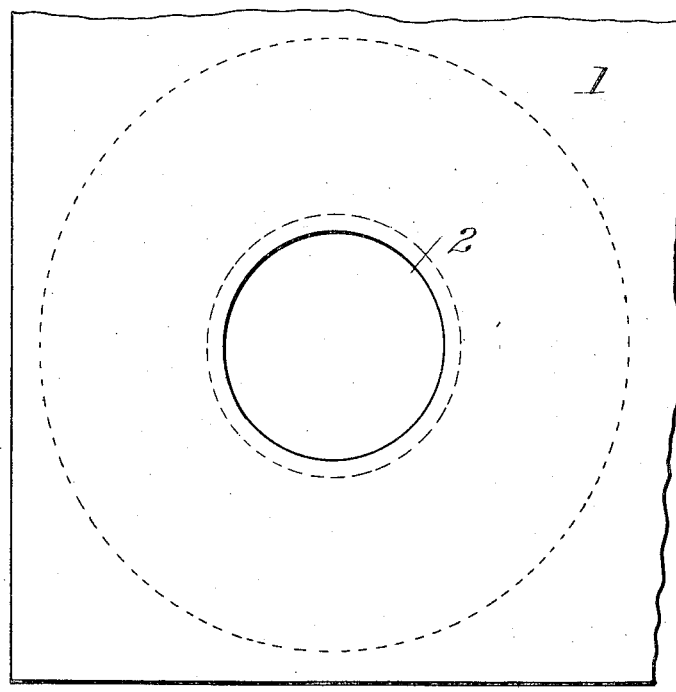
Figure 2:
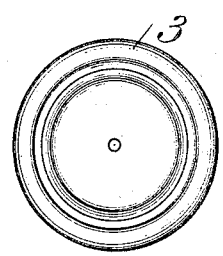
Figure 3:
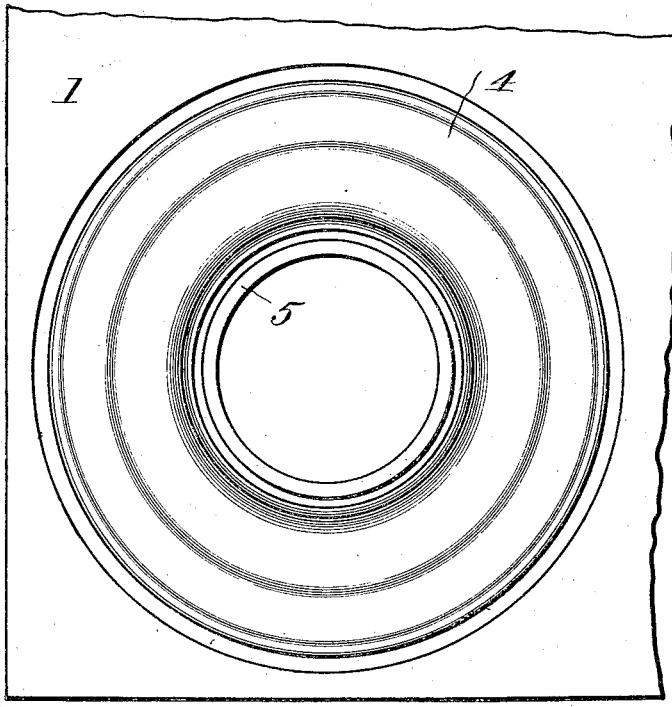
Figure 4:
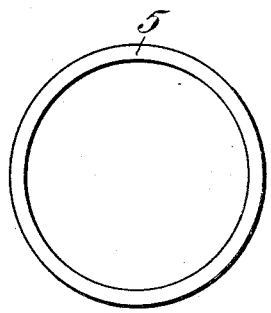
Figure 5:
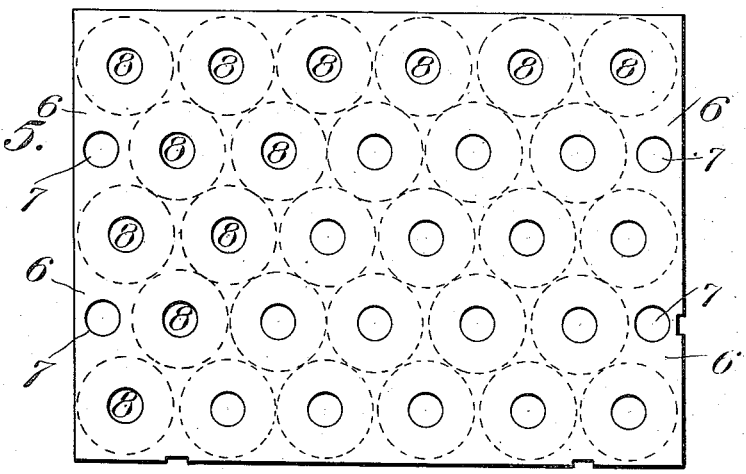
Figure 6:
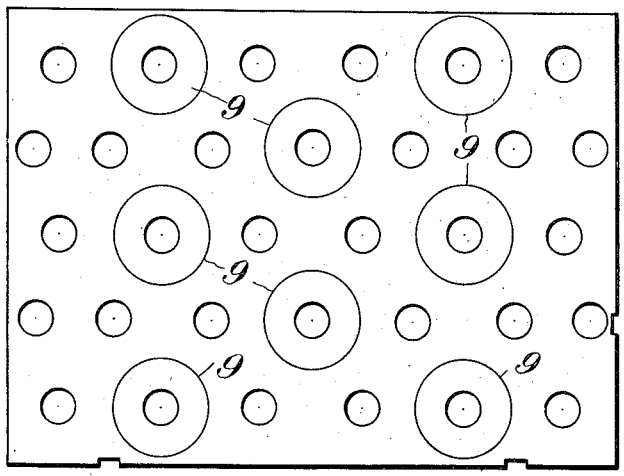
Figure 7:
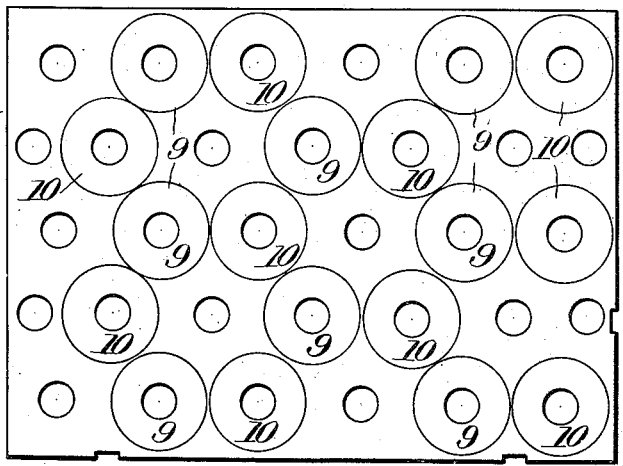

In the drawings which show by way of illustration one embodiment of the invention:—Figure 1 shows a portion of metal from which the can cap has been cut, also showing in dotted lines, the position of the material which is to form the can head. Fig. 2 is a plan view of a can cap cut and formed from the material shown in Fig. 1. Fig. 3 shows a piece of material from which a can cap has been cut, also showing a can head cut and formed from the material and the remaining waste material cut to form the central opening in the can head. Fig. 4 is a plan view of the remaining waste material, cut in forming the central opening in the can head. Fig. 5 shows a sheet of material from which a plurality of can caps have been cut at the same time of the cutting of the can caps from the waste ends, also showing in dotted lines the position of the can ends subsequently cut from the sheet of metal. Fig. 6 is a view showing a sheet of metal having the can caps cut therefrom, and also showing the position of a series of can ends which may be cut from said sheet of metal in a subsequent operation. Fig. 7 is a view similar to Fig. 6, showing the position of an additional series of can ends which may be cut from said sheet of metal.

Prior to my invention, it has been the common practice to utilize the waste material cut from a sheet of metal in forming the central opening in the can end to form the can cap for a smaller size can. This waste material has been handled piece by piece, and not only considerable time is consumed in the forming of the can caps, but it is also somewhat difficult to properly position the waste material so that the can cap may be cut therefrom, and also the waste material after cutting and forming the can cap at times interferes with the proper operation of cutting the can caps. By my improved method I first cut the can cap from the material, which is to form the can end before cutting out and forming the can end.

Referring to the drawings, Fig. 1 shows a piece of metal 1, from which a metal disk has been cut, leaving an opening 2. Said disk is cut by a die which shapes and perforates the can cap 3, shown in Fig. 2. After having cut and formed the can cap, the sheet of metal 1 is then presented to another die which in a single operation will cut and shape a can end 4, and at the same time cut out the remaining waste material 5, (see Figs. 3 and 4), to form the central opening of the can end.

It would be practically impossible to cut in one operation a disk from the material of the same size as the central opening in the can end, and to subsequently locate said sheet of metal so that the can end would be cut with the opening properly in register with the desired opening in the center of the can end. By my method it is immaterial whether the can cap be located exactly centrally of the waste material cut out in forming the central opening in the can end, for the reason that when the can end is cut out, the remaining waste material is removed from the central portion of the can end, thus properly forming said central opening.

It is immaterial of course, whether the waste material 5 is uniform in width, so long as the disk forming the can cap is located within the outer circumference of the disk of waste material, so that said waste material 5 will remain intact throughout its entire circumference.

It will be noted that in cutting out the can end, the waste material 5 may pass down through the bed of the die cutting machine, while the formed can ends are discharged in the usual way at one side of the bed. This discharging of the waste material down through the bed separates the waste material from the finished can ends and thus facilitates the operation of the die cutting machine.

While my invention is useful in cutting out can caps one at a time from a sheet of metal and subsequently cutting out and forming the can ends, said invention is of greater advantage in cutting and forming can caps and can ends by a gang of dies.

In Fig. 5, I have shown a sheet of metal in which is indicated in dotted lines, a series of can ends which may be cut from said sheet of metal and which can ends have a staggered relation relative to each other. By this arrangement of the can ends, a maximum number of can ends may be cut from said sheet and the waste material 6, 6, will be concentrated at the ends of the sheet, thus reducing the waste material to a minimum and locating the same, whereby it may be utilized. It is customary to cut from these waste ends can caps or blanks 7, 7. In order that the sheet of material may be more easily handled in cutting the can cap 7, 7, said material is presented to a gang of dies prior to the cutting of the can ends, and said can caps or blanks 7, 7, cut and shaped.

I have found that by my method I may provide a gang of dies which will cut the can caps or blanks 8, from the waste material which is to be cut out in forming the central opening in each can end. Therefore, according to my invention, I have provided a gang of dies which will simultaneously cut and form the can caps or blanks from the waste ends and from the waste material cut in forming the central opening in each can end. Subsequently to the cutting of the can caps, the sheet of metal is presented to a gang of dies for cutting the can ends, and in the same operation that the can ends are cut and formed, the remaining waste material is cut to form the central opening of the can end in the same manner as described in connection with Figs. 1 to 4. There are many different ways of arranging the dies for cutting a staggered arrangement of can ends, and the arrangement herein shown is used solely for the purpose of illustration, and forms no part of the present invention. Any other desired arrangement of dies may be used, the essential feature of my invention being that the waste material which is to form the central opening in the can end, shall be cut to form the can cap or blank prior to the cutting of the can end. After having cut and shaped the can caps from the entire sheet, said sheet of metal is presented to a gang of dies and a series of can ends 9 herein shown as eight in number, are cut from said sheet, said ends being so disposed that the opening formed by the cutting of the can cap is located substantially centrally of the opening forming the center of the can head. After cutting the can heads 9, the sheet of metal is presented to another gang of dies and a series of can heads 10, herein shown as ten in number, are cut from said material which are located as herein shown in Fig. 7. The sheet is then shifted end for end, and presented to the same gang of dies which will cut the remaining can ends indicated in dotted lines in Fig. 5.

It will be seen that by my improved method, the can caps or blanks may be cut from the waste material forming the central opening of the can ends at the same time that the waste ends of the sheet are cut and therefore, I am able to cut all of my can caps or blanks without presenting the waste material one by one to a machine and in fact, without subjecting the sheet of metal to any additional operations other than have been hereinbefore followed in cutting the can ends and in utilizing the waste ends of the sheet of metal.

While I have described my method as specially adapted for cutting can caps from waste material cut out in forming the can end, it will be understood that from certain aspects of the invention, other articles or forms may be made from the disk or waste material cut from the can end. As a matter of fact, in cutting out the openings in the smallest size can end, it will be impractical to utilize this waste material to form can caps for the reason that the can cap cut and shaped in the waste material in a can end, must necessarily be used in connection with a smaller size can end. Therefore, this waste material from the smallest size can ends must be utilized for other articles or forms than can caps.

The essential feature of the invention, is the cutting of a can cap or other article from the waste material cut out in forming the can end utilizing only a portion of said waste material, so that there is a small portion of waste material remaining which may be cut out to properly form the central opening, in the can end.

Having thus described my invention, what I claim as new and desire to secure by Letters Patent, is:—

1. The method of cutting and forming can ends having a central opening, from sheet metal, and utilizing the waste material cut out in forming the central opening, consisting in cutting a disk from the material to be wasted in cutting the central opening in the can end, of smaller diameter than said waste material, simultaneously shaping said disk into any desired form, and subsequently in another operation simultaneously cutting and shaping a can end and cutting out the remaining waste material to form the central opening.

2. The method of cutting and forming can caps and can ends, having a central opening, from sheet metal, consisting in cutting a disk from the material to be wasted in cutting the central opening in the can end of smaller diameter than said waste material, simultaneously shaping said disk into a can cap, and subsequently in another operation simultaneously cutting and shaping a can end and cutting out the remaining waste material to form the central opening.

3. The method of cutting and forming can ends having a central opening, from sheet metal, and utilizing the waste material cut out in forming the central opening, consisting in cutting in one operation by a gang of dies a series of disks, one from the metal to be wasted in cutting the central opening in each can end, said disk being of smaller diameter than said waste material, simultaneously shaping said disk into any desired form, cutting and shaping by subsequent operations by a gang of dies the can ends, and simultaneously cutting out the remaining waste material to form the central opening.

4. The method of cutting and forming can caps and can ends having a central opening, from sheet metal, consisting in cutting in one operation by a gang of dies a series of disks, one from the material to be wasted in cutting the central opening in each can end, said disk being of smaller diameter than said waste material, simultaneously shaping said disks into can caps, cutting and shaping in another operation by a gang of dies a series of can ends and simultaneously cutting out the remaining waste material to form the central opening, and cutting and shaping in subsequent operations by a gang of dies the remaining can ends.

In testimony whereof I affix my signature, in presence of two witnesses.

BERNARD H. LARKIN.

Witnesses:
E. E. FINNEGAN,
C. W. FULLER.